United States Patent [19]

Lesueur

[11] 3,743,929

[45] July 3, 1973

[54] CURRENT REDUCERS UTILIZING THE FARADAY EFFECT

[75] Inventor: Gilbert Lesueur, Aix-les-Bains, France

[73] Assignee: Alsthom-Savoisienne, Saint-Ouen, France

[22] Filed: Nov. 6, 1970

[21] Appl. No.: 87,417

[30] Foreign Application Priority Data

Nov. 6, 1969 France .............................. 6938300

[52] U.S. Cl. .................................. 324/96, 250/225

[51] Int. Cl. ............................................. G05f 3/00

[58] Field of Search.................... 250/225, 227, 231; 324/96; 350/151

[56] References Cited

UNITED STATES PATENTS

| | | | |
|---|---|---|---|
| 3,621,390 | 11/1971 | Von Willisen | 324/96 |
| 3,581,202 | 5/1971 | Pelenc | 324/96 |
| 3,283,644 | 11/1966 | Saltzman | 250/225 |
| 3,296,921 | 1/1967 | Polster | 250/225 |
| 3,419,803 | 12/1968 | Pelenc et al. | 324/96 |
| 3,419,802 | 12/1968 | Pelenc et al. | 324/96 |
| 3,324,393 | 6/1967 | Casey et al. | 324/96 |

*Primary Examiner*—Walter Stolwein
*Attorney*—Craig & Antonelli

[57] ABSTRACT

Improvement regarding current reducers utilizing the Faraday effect of magneto-optical rotation of polarized light, characterized in that a first beam passes through a first polarizer prior to penetrating into a magneto-optical material and is analyzed by a second polarizer at the output of the magneto-optical material, and in that a second beam is polarized by said second polarizer and analyzed by said first polarizer, the two polarizers having their axes of polarization shifted by certain angle.

10 Claims, 3 Drawing Figures

11
18
10
12
16
17
14
15
20
22
13
19
21
SUBTRACTION DEVICE 23

Patented July 3, 1973 3,743,929
2 Sheets-Sheet 1
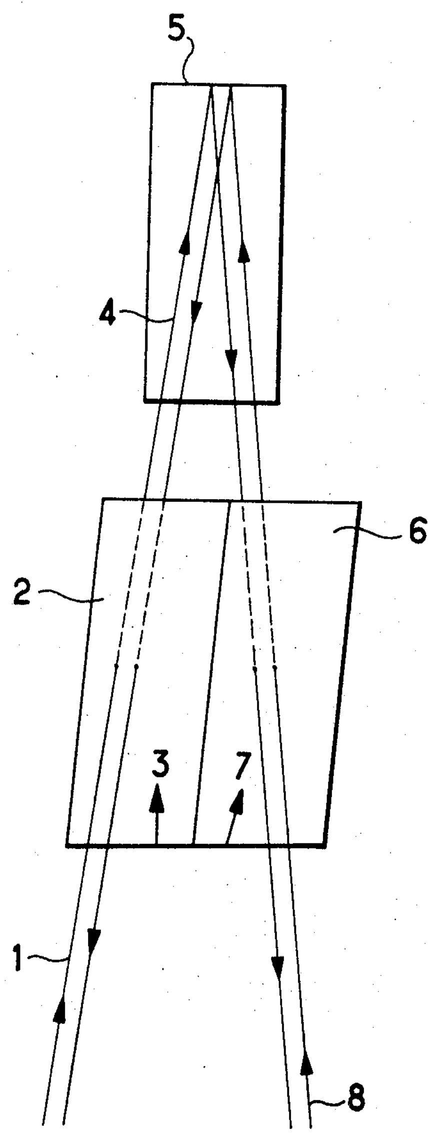
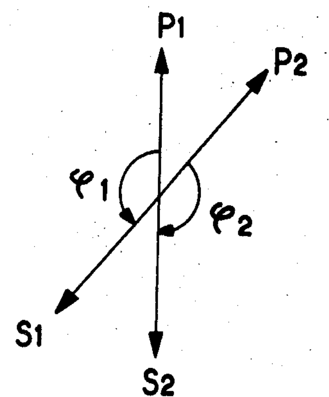
INVENTOR
GILBERT LESUEUR
BY Craig, Antonelli, Stewart & Hill
ATTORNEYS

CURRENT REDUCERS UTILIZING THE FARADAY EFFECT

The present invention relates to devices for measuring the intensity of a current circulating in a conductor having a high potential applied thereto, utilizing the Faraday effect.

In a known system for measuring the intensity of a current by means of the Faraday effect, a magneto-optical material, such as flint glass, is subjected to the influence of a magnetic field produced by the current to be measured. It is furthermore traversed — in a direction parallel to its axis — by a luminous beam which has been polarized previously in a given direction. In the course of passage of the beam through the magneto-optical material, the plane of polarization of the luminous beam turns through an angle whose value is a function of the axial component of the magnetic field applied to the magneto-optical material. The luminous beam emerging from the magneto-optical material is analyzed in two symmetrical directions with respect to the plane of polarization of the incident luminous beam. Two photo-sensitive elements measure the intensity of the light after the analysis thereof.

These directions of analysis advantageously form angles of +60° and −60° with the direction of polarization of the incident beam. In this case, the subtraction of the two signals derived from the photo-sensitive elements makes it possible to obtain a signal proportional to the sine of double the angle of rotation of the plane of polarization of the luminous beam in the magneto-optical material. However, it is indispensable that the two analysis directions be symmetrical with respect to the direction of polarization of the incident beam; in other words, that the angles formed by the direction of polarization with each of the analysis directions be equal and of opposite direction. A slight displacement or shift which destroys the symmetry causes an error term to appear in the electrical signal which practically prevents any precise measurement of low intensities.

The present invention has the object of eliminating the difficulty that consists in actual practice in obtaining equality of the two angles formed, on the one hand, by the plane of polarization and the first analysis plane and, on the other hand, by the plane of polarization and the second analysis plane.

The present invention is directed to and concerned with an improvement regarding devices for measuring the intensity of a current circulating in a conductor having a high potential, by means of the Faraday effect, comprising a magneto-optical device which is excited by a magnetic field produced by the current to be measured and traversed by at least one incident luminous beam which is polarized in a fixed direction, charactertized by the fact that the magneto-optical device is traversed by two luminous beams, and by the fact that it comprises a first and a second polarizer, the first polarizer being situated, on the one hand, on the path of a first luminous beam upstream of the magneto-optical device and, on the other hand, on the path of a second luminous beam downstream of the magneto-optical device, the second polarizer being situated, on the one hand, on the path of the aforementioned first luminous beam downstream of the magneto-optical device and, on the other hand, on the path of the aforementioned second luminous beam upstream of the magneto-optical device, the axes of polarization of the two polarizers being shifted or displaced about a certain angle.

With reference to the accompanying drawing, one embodiment of the present invention, given in a non-limitative manner, will now be further described hereinbelow.

FIG. 1 represents a vectorial diagram of the polarization and analysis directions;

FIG. 2 illustrates a practical arrangement of the magneto-optical device and of the first as well as the second polarizer.

Figure 3:
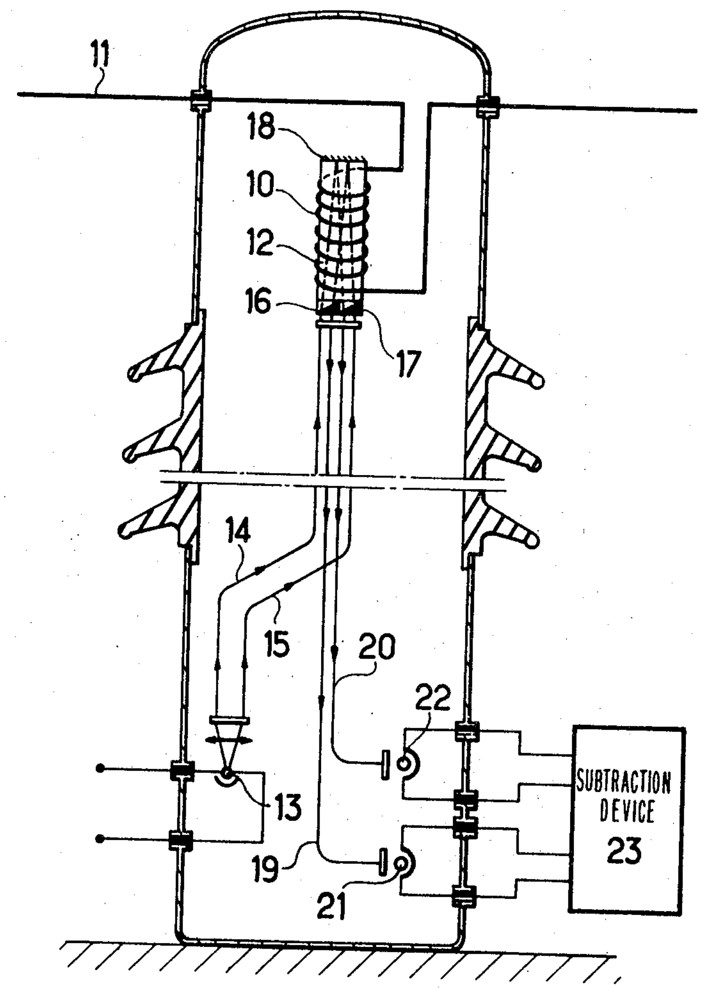
FIG. 3 illustrates the practical arrangement of a current reducer comprising the improvement proposed by the present invention.

In this example, two luminous beams are used which traverse parallel paths in opposite directions in a manner such that one beam is polarized by a first polarizer in a direction P1, passes through the magneto-optical element and is analyzed by a second polarizer in a direction S2, and the other beam is polarized by the second polarizer in a direction P2, traverses the magneto-optical element and is analyzed by the first polarizer in a direction S1.

FIG. 1 is a vectorial diagram representing the different directions of polarization and analysis. It shows that the polarization direction P1 and the analysis direction S2 are parallel and have an opposite direction since the luminous beams traverse the first polarizer in opposite directions, and the same holds true for the polarization direction P2 and the analysis direction S1. The angle $\phi$ 1 formed by the polarization direction P1 with the analysis direction S1 of the first beam is equal and of opposite direction with regard to the angle $\phi$ 2 formed by the polarization direction P2 with the analysis direction S2 of the second beam. This property is preserved irrespective of the angle which is formed between the polarization directions of the first and second polarizers. The angle $\phi$ 1 and $\phi$ 2 will perhaps not have exactly the desired value but they will remain equal and have opposite directions.

FIG. 2 illustrates a practical arrangement which makes it possible to obtain this result. A first beam 1 passes through or traverses a first polarizer 2 (a Polaroid filter, for example) whose polarization direction is shown by the arrow 3; the beam 1 penetrates into a flint glass element 4, is reflected at the rear face 5 thereof and is then analyzed by another polarizer 6 whose polarization direction is shown by the arrow 7. A second luminous beam 8 traverses the inverse path, i.e., it is first polarized by the polarizer 6, penetrates thereafter into the flint glass element 4, is reflected at surface 5 and finally is analyzed by the polarizer 2. The two beams 1 and 8 follow parallel adjacent paths in opposite directions.

The desired angle $\phi$ is obtained by suitable shifting or displacement of the axes of polarization of the polarizer 2 and 6, as shown by the arrows 3 and 7.

FIG. 3 shows an embodiment of a current reducer comprising the improvement proposed by the present invention. A coil 10 traversed by the current circulating in the high voltage conductor 11 surrounds a flint glass element 12. A light source 13 emits two luminous beams guided by the optical fibers 14 and 15. The optical fibers 14 terminate at a first polarizer 16; the optical fibers 15 terminate at a second polarizer 17. The first and second polarizers 16 and 17 are placed side by side adjacent one face of the flint glass element 12. The opposite face 18 of the flint glass element is equipped with a reflecting layer. The luminous beam issued by the optical fibers 14 traverses the first polarizer 16, penetrates into the flint glass element 12, is reflected on the face 18 of the flint glass element 12, traverses the second polarizer 17, which transforms the rotation of its plane of polarization into a luminous intensity variation, is guided by optical fibers 20 and terminates at a photo-sensitive element 22. The luminous beam issued by the optical fibers 15 traverses the second polarizer 17, penetrates into the flint glass element 12, is reflected on the face 18 of the flint glass element 12, traverses the first polarizer 16, which transforms the rotation of its plane of polarization into a luminous intensity variation, is guided by optical fibers 19 and terminates at a photo-sensitive element 21. The electronic device 23 effects the subtraction of the signals emitted by the photo-sensitive elements 21 and 22 and furnishes at the output a signal which is a function of the angle of rotation undergone by the planes of polarization of the beams in the flint glass element 12, which is itself a function of the intensity of the current in the conductor 11.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A device for measuring the intensity of a current flowing in a high voltage conductor with the aid of the Faraday effect, comprising a magneto-optical device excited by a magnetic field produced by the current in said conductor to be measured, means for generating first and second luminous beams along respective paths through said magneto-optical device, and a first and a second polarizer, said first polarizer being positioned in the path of said first luminous beam upstream of said magneto-optical device and in the path of said second luminous beam downstream of said magneto-optical device, said second polarizer being positioned in the path of said first luminous beam downstream of said magneto-optical device and in the path of said second luminous beam upstream of said magneto-optical device, the axes of polarization of said first and second polarizers being shifted with respect to each other by a predetermined angle.

2. A device as defined in claim 1, wherein said means for generating first and second luminous beams includes directing means for directing said first and second beams along parallel paths in opposite directions.

3. A device as defined in claim 1, wherein said first and second polarizers are positioned side-by-side against one face of said magneto-optical device so that said first and second luminous beams penetrating into said magneto-optical device by way of said one face are reflected on an opposite face of said device to thereby pass out again through said one face.

4. A device as defined in claim 1 further including means for detecting the respective intensities of said first and second luminous beams at the end of said first and second paths.

5. A device as defined in claim 4, wherein said means for generating first and second luminous beams includes directing means for directing said first and second beams along parallel paths in opposite directions.

6. A device as defined in claim 5, wherein said directing means includes first and second light conducting conduits connecting a light source to said first and second polarizers.

7. A device as defined in claim 6, wherein said detecting means comprises a pair of photodetectors generating respective signals indicative of the intensities of the light detected thereby.

8. A device as defined in claim 7, further including means connected to said photodetectors for comparing the signal outputs thereof.

9. A device as defined in claim 1, further including a pair of photo detectors for detecting the respective intensities of said first and second luminous beams at the end of said first and second paths and means for comparing the signal outputs of said photo detectors with each other.

10. A device as defined in claim 1, wherein each of said first and second polarizers is a linear polarizer.

* * * * *